United States Patent
Fujimaki et al.

(10) Patent No.: US 11,162,966 B2
(45) Date of Patent: Nov. 2, 2021

(54) MONITORING DEVICE AND MONITORING METHOD OF MAIN SPINDLE ROTATION SPEED IN MACHINE TOOL, AND MACHINE TOOL

(71) Applicant: OKUMA CORPORATION, Niwa-Gun (JP)

(72) Inventors: Shunsuke Fujimaki, Niwa-Gun (JP); Akihide Hamaguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/061,714

(22) Filed: Oct. 2, 2020

(65) Prior Publication Data
US 2021/0132102 A1     May 6, 2021

(30) Foreign Application Priority Data
Nov. 1, 2019   (JP) .............................. JP2019-200118

(51) Int. Cl.
*G01P 3/02* (2006.01)
*G01P 1/07* (2006.01)

(52) U.S. Cl.
CPC . *G01P 3/02* (2013.01); *G01P 1/07* (2013.01)

(58) Field of Classification Search
CPC ... G01P 3/02; G01P 1/07; G05B 2219/31467; G05B 2219/41256; G05B 19/4063; B23Q 17/0976
See application file for complete search history.

(56) References Cited

U.S. PATENT DOCUMENTS

| | | | | |
|---|---|---|---|---|
| 2,086,852 A | * | 7/1937 | Bullard | B23Q 39/042 29/38 A |
| 5,117,544 A | * | 6/1992 | Kousaku | B23B 3/06 29/270 |
| 5,953,970 A | * | 9/1999 | Haller | B23G 1/08 82/129 |
| 9,122,257 B2 | * | 9/2015 | Ueno | G05B 15/02 |
| 9,662,727 B2 | * | 5/2017 | Nishimura | B23G 1/04 |
| 11,059,115 B2 | * | 7/2021 | Kanda | B23F 23/10 |

(Continued)

FOREIGN PATENT DOCUMENTS

| | | | | |
|---|---|---|---|---|
| CN | 1621660 A | * | 6/2005 | ............. F01C 1/322 |
| JP | S49-105277 A1 | | 10/1974 | |
| JP | 5507410 B2 | | 5/2014 | |

*Primary Examiner* — Tung S Lau
(74) *Attorney, Agent, or Firm* — Burr & Brown, PLLC

(57) ABSTRACT

A monitoring device of a main spindle rotation speed in a machine tool displays a variation state of the rotation speed by a rotation speed variation unit using a display unit in the machine tool. The monitoring device includes a drawing unit, a variation position display unit, and a reduction effect index display unit. The drawing unit is configured to display a variation diagram that illustrates a relationship between a variation amplitude and a variation cycle of the rotation speed. The reduction effect index display unit is configured to display a reduction effect index on the variation diagram. The reduction effect index represents a reduction effect of chatter vibration. The reduction effect index is calculated based on a speed ratio that is a ratio of a rotation speed of one rotation before to a rotation speed at an identical rotation position of the main spindle at any given timing.

18 Claims, 4 Drawing Sheets

(56) References Cited

U.S. PATENT DOCUMENTS

| | | | |
|---|---|---|---|
| 2006/0047357 A1* | 3/2006 | Tanaka | G05B 19/186 |
| | | | 700/160 |
| 2012/0093598 A1* | 4/2012 | Ando | B23Q 17/007 |
| | | | 408/16 |
| 2012/0097411 A1 | 4/2012 | Yoshino et al. | |
| 2014/0121816 A1* | 5/2014 | Nishimura | B23G 1/04 |
| | | | 700/159 |
| 2015/0022134 A1* | 1/2015 | Inagaki | B23Q 15/08 |
| | | | 318/478 |
| 2017/0106487 A1* | 4/2017 | Yamamoto | B23Q 17/10 |
| 2021/0101241 A1* | 4/2021 | Hongo | B23Q 15/12 |
| 2021/0132101 A1* | 5/2021 | Fujimaki | G05B 19/4065 |

* cited by examiner

MONITORING DEVICE AND MONITORING METHOD OF MAIN SPINDLE ROTATION SPEED IN MACHINE TOOL, AND MACHINE TOOL

BACKGROUND OF THE INVENTION

This application claims the benefit of Japanese Patent Application Number 2019-200118 filed on Nov. 1, 2019, the entirety of which is incorporated by reference.

TECHNICAL FIELD OF THE INVENTION

The disclosure relates to a monitoring method and a monitoring device that display a variation state of a rotation speed, which is varied by a rotation speed variation unit, by using a display unit in a machine tool, and the machine tool with the monitoring device. The machine tool includes a main spindle and the rotation speed variation unit. A tool or a workpiece is mounted to the main spindle which is motor-driven. The rotation speed variation unit continuously varies the rotation speed of the main spindle in any given pattern.

DESCRIPTION OF RELATED ART

When a machine tool that includes a main spindle to which a tool or a workpiece is mounted to be motor-driven performs a cutting work, so-called "chatter vibration" occurs in some cases due to low rigidity of the tool or the workpiece. The chatter vibration causes problems, such as a partial loss of the tool and deterioration of surface accuracy of the workpiece. The chatter vibration is a vibration that increases due to variation of cutting thickness of the workpiece caused by a phase lag between an undulation occurred in a machined surface one rotation before and a vibration caused by the current cutting.

As a technique to reduce the chatter vibration, countermeasures described in Japanese Patent Application Publication No. S49-105277 and Japanese Patent No. 5507410 are known. The countermeasures vary a rotation speed of a main spindle by a predetermined variation amplitude and a variation cycle to make an input of power irregular by variation of a cutting thickness. In particular, in the monitoring device described in Japanese Patent No. 5507410, displaying, for example, an output limit line of a motor facilitates selecting a variation condition within an output limit range of the motor to improve the usability.

However, the disclosure of Japanese Patent No. 5507410 cannot determine whether the reduction effect of chatter vibration can be sufficiently obtained within the output limit range of the motor. Therefore, even when the variation condition that can reduce the chatter vibration is absent in the output limit range of the motor, trial machining is repeated, which results in impaired productivity.

Therefore, an object of the disclosure is to provide a monitoring method and a monitoring device of a main spindle rotation speed in a machine tool that includes a rotation speed variation unit that continuously varies the main spindle rotation speed in any given pattern and the machine tool. The monitoring method and the monitoring device allow selecting a setting value to vary the rotation speed and performing trial machining after grasping its reduction effect of chatter vibration, and allow efficiently finding a machining condition optimal to reduce a chatter vibration.

SUMMARY OF THE INVENTION

In order to achieve the above-described object, a monitoring device of a main spindle rotation speed in a machine tool according to a first aspect of the disclosure is provided. The monitoring device displays a variation state of the rotation speed by a rotation speed variation unit using a display unit in the machine tool. The machine tool includes a main spindle and the rotation speed variation unit. The main spindle to which a tool or a workpiece is mounted is motor-driven. The rotation speed variation unit continuously varies the rotation speed of the main spindle in any given pattern. The monitoring device includes a drawing unit, a variation position display unit, and a reduction effect index display unit. The drawing unit is configured to display a variation diagram in the display unit. The variation diagram illustrates a relationship between a variation amplitude and a variation cycle of the rotation speed. The variation position display unit is configured to display a current variation position in the variation diagram. The reduction effect index display unit is configured to display a reduction effect index on the variation diagram. The reduction effect index represents a reduction effect of chatter vibration. The reduction effect index is calculated based on a speed ratio that is a ratio of a rotation speed of one rotation before to a rotation speed at an identical rotation position of the main spindle at any given timing.

In the disclosure of a second aspect in the above-described configuration, the reduction effect index is an absolute value of a difference between the speed ratio and 1.

In the disclosure of a third aspect in the above-described configuration, the varying reduction effect index is an average value per variation cycle of the rotation speed.

In the disclosure of a fourth aspect in the above-described configuration, the varying reduction effect index is a maximum value in one variation cycle of the rotation speed.

The disclosure of a fifth aspect in the above-described configuration further includes an output limit line display unit configured to generate an output limit line of a motor based on a calculation formula and display the output limit line on the variation diagram. The calculation formula includes the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, and a maximum output of the motor that drives the main spindle.

In the disclosure of a sixth aspect in the above-described configuration, the calculation formula is Math. 1 below.

$$R = \frac{2J}{P - P_C}(S_1 - S_2)S_1 \qquad [\text{Math. 1}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output In the disclosure of a seventh aspect in the above-described, the calculation formula includes a ratio of the first rotation speed to the second rotation speed.

In the disclosure of an eighth aspect in the above-described configuration, the calculation formula is Math. 2 below.

$$R = \frac{2J}{P - P_C}(S_1 - S_2)S_1 \frac{S_1}{S_2} \qquad \text{[Math. 2]}$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output In the disclosure of a ninth aspect in the above-described configuration, any one of the first rotation speed and the second rotation speed is set as a maximum value of the rotation speed and another is set as a minimum value of the rotation speed.

In order to achieve the above-described object, there is provided a machine tool according to a tenth aspect of the disclosure. The machine tool includes a main spindle, a rotation speed variation unit, and the monitoring device of the main spindle rotation speed according to any one of the first aspect to the ninth aspect. The main spindle to which a tool or a workpiece is mounted is motor-driven. The rotation speed variation unit is configured to continuously vary the rotation speed of the main spindle in any given pattern.

In order to achieve the above-described object, a monitoring method of a main spindle rotation speed in a machine tool according to an eleventh aspect of the disclosure is provided. The monitoring method displays a variation state of the rotation speed by a rotation speed variation unit using a display unit in the machine tool. The machine tool includes a main spindle and the rotation speed variation unit. The main spindle to which a tool or a workpiece is mounted is motor-driven. The rotation speed variation unit continuously varies the rotation speed of the main spindle in any given pattern. The monitoring method includes a drawing step, a variation position display step, and a reduction effect index display step. The drawing step is a step of displaying a variation diagram in the display unit. The variation diagram illustrates a relationship between a variation amplitude and a variation cycle of the rotation speed. The variation position display step is a step of displaying a current variation position in the variation diagram. The reduction effect index display step is a step of displaying a reduction effect index on the variation diagram. The reduction effect index represents a reduction effect of chatter vibration. The reduction effect index is calculated based on a speed ratio that is a ratio of a rotation speed of one rotation before to a rotation speed at an identical rotation position of the main spindle at any given timing.

In the disclosure of a twelfth aspect in the above-described configuration, the reduction effect index is an absolute value of a difference between the speed ratio and 1.

In the disclosure of a thirteenth aspect in the above-described configuration, the varying reduction effect index is an average value per variation cycle of the rotation speed.

In the disclosure of a fourteenth aspect in the above-described configuration, the varying reduction effect index is a maximum value in one variation cycle of the rotation speed.

The disclosure of a fifteenth aspect in the above-described configuration further includes an output limit line display step of generating an output limit line of a motor based on a calculation formula and displaying the output limit line on the variation diagram. The calculation formula includes the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, and a maximum output of the motor that drives the main spindle.

In the disclosure of a sixteenth aspect in the above-described configuration, the calculation formula is Math. 1 below.

$$R = \frac{2J}{P - P_C}(S_1 - S_2)S_1 \qquad \text{[Math. 1]}$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output In the disclosure of a seventeenth aspect in the above-described configuration, the calculation formula includes a ratio of the first rotation speed to the second rotation speed.

In the disclosure of an eighteenth aspect in the above-described configuration, the calculation formula is Math. 2 below.

$$R = \frac{2J}{P - P_C}(S_1 - S_2)S_1 \frac{S_1}{S_2} \qquad \text{[Math. 2]}$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output In the disclosure of a nineteenth aspect in the above-described configuration, any one of the first rotation speed and the second rotation speed is set as a maximum value of the rotation speed and another is set as a minimum value of the rotation speed.

With the disclosure, the reduction effect index of chatter vibration is displayed. Therefore, after reduction effect of chatter vibration is grasped, the setting value to vary the rotation speed is selected and the trial machining is performed. Accordingly, the machining condition optimal to reduce the chatter vibration can be efficiently found.

Especially, with the disclosure described in the fifth aspect to the ninth aspect and the fifteenth aspect to the nineteenth aspect, in addition to the above-described effects, since the variation condition is searched after grasping also the output limit line of the motor, it is possible to avoid the selection of the variation condition exceeding the output limit of the motor.

DETAILED DESCRIPTION OF THE INVENTION

The following describes embodiments of the disclosure based on the drawings.

Figure 1:
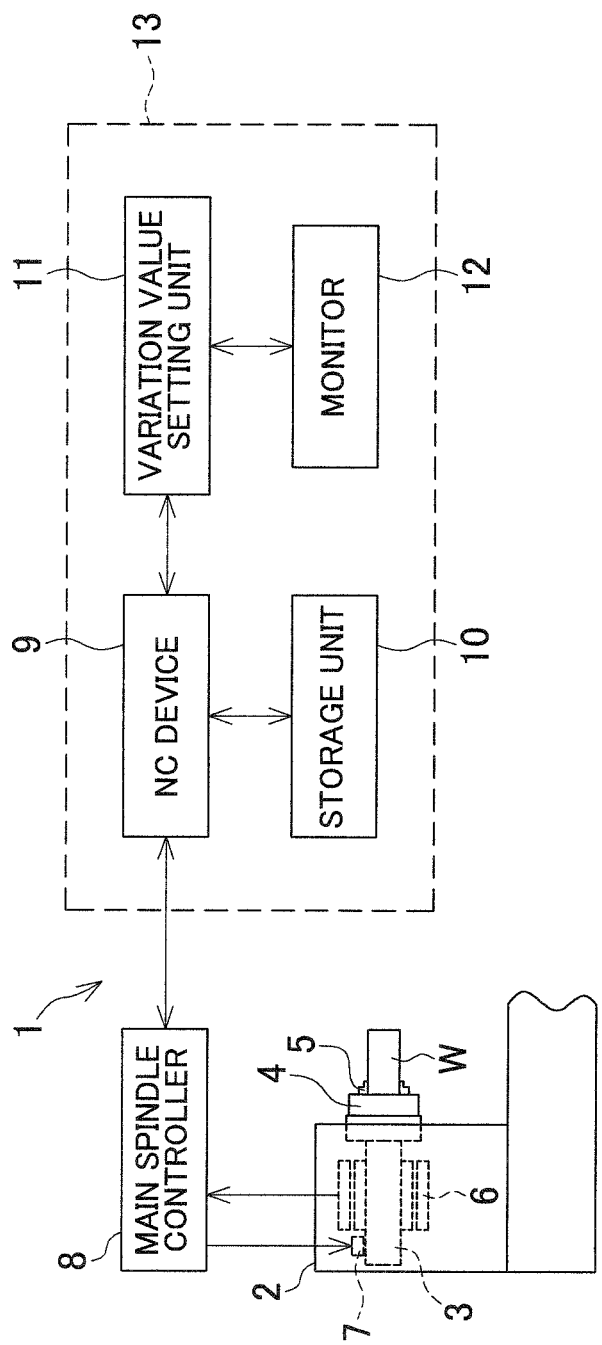
FIG. 1 is a schematic configuration diagram of an NC lathe.

FIG. 1 is a schematic configuration diagram of an NC lathe 1 as one example of a machine tool. In the NC lathe 1, a main spindle 3 that grips a workpiece W via a chuck 4 and a claw 5 is rotatably journaled to a head stock 2. Inside of the head stock 2, a motor 6 that rotatably drives the main spindle 3 and an encoder 7 that is secured to the head stock 2 and detects a rotation speed of the main spindle 3 are built-in. A main spindle controller 8 is connected to the motor 6 and the encoder 7, and an NC device 9 commands the rotation speed to the main spindle controller 8. While the main spindle controller 8 always monitors the rotation speed of the main spindle 3 detected by the encoder 7, the main spindle controller 8 adjusts an input electric power supplied to the motor 6 such that the main spindle 3 is rotated at the rotation speed commanded by the NC device 9.

A storage unit 10 and a variation value setting unit 11 are connected to the NC device 9. The storage unit 10 stores a machining program and the like, and the variation value setting unit 11 includes a monitor 12 as a display unit. Following the machining program stored in the storage unit 10, while the NC device 9 rotates the main spindle 3, the NC device 9 feeds and moves a tool (not illustrated) in a rotation axis direction and a radial direction of the workpiece W for cutting work.

Furthermore, the rotation speed of the main spindle 3 and its variation amplitude and variation cycle are input from the monitor 12 including an input unit to the variation value setting unit 11. Thus, as illustrated in the upper graph in FIG. 2, the rotation speed of the main spindle 3 can be varied with a designated variation amplitude Q and a variation cycle R via the NC device 9 and the main spindle controller 8. A monitoring device 13 includes the NC device 9, the storage unit 10, the variation value setting unit 11, and the monitor 12. The NC device 9 serves as a rotation speed variation unit and the variation value setting unit 11 serves as a variation value setting unit. The monitoring device 13 functions as a drawing unit, a variation position display unit, a reduction effect index display unit, and an output limit line display unit of the disclosure.

Figure 3:
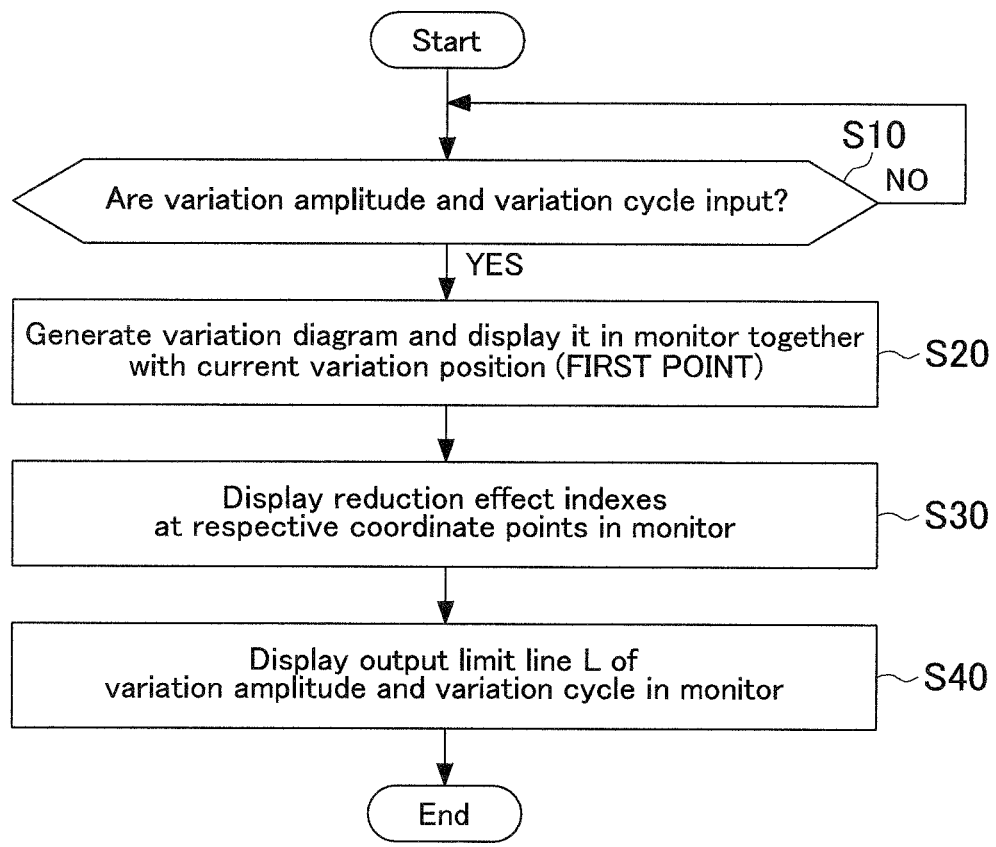
FIG. 3 is a flowchart for a monitoring method.

A monitoring method of the main spindle rotation speed by the monitoring device 13 will be described with the flowchart of FIG. 3.

Figure 4:
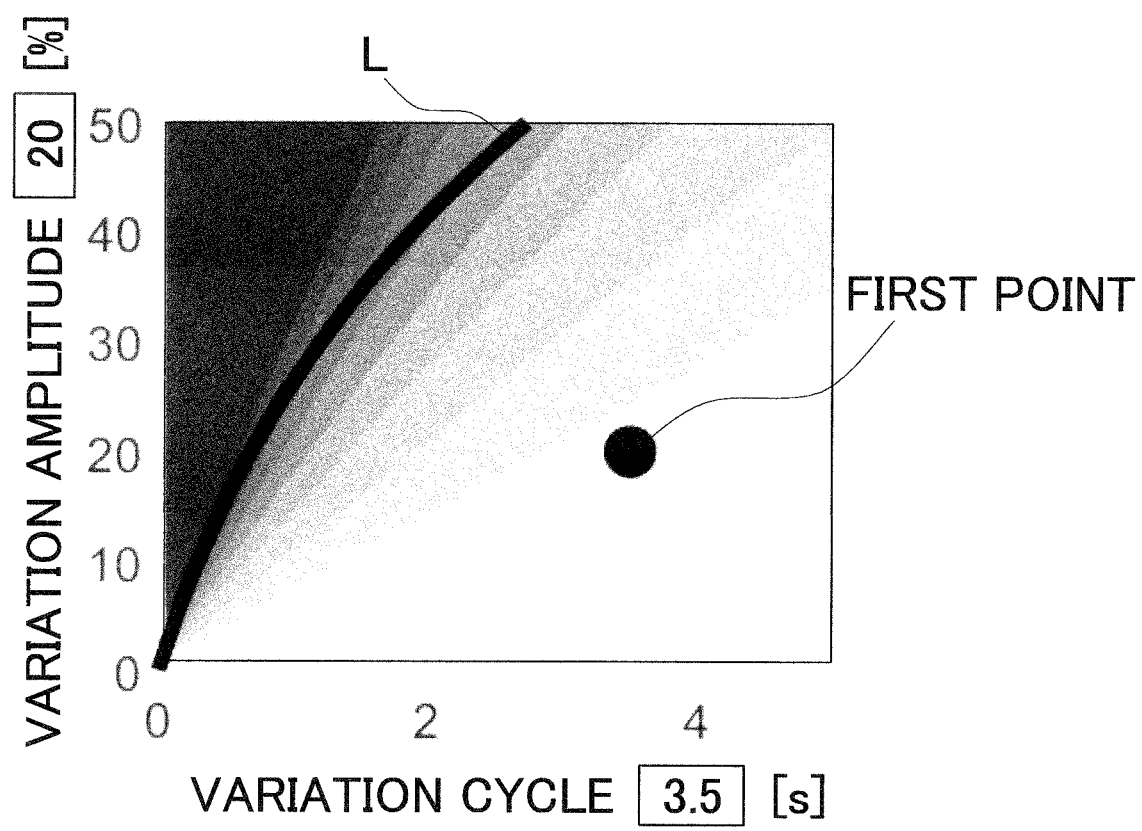
FIG. 4 is an explanatory view illustrating a variation diagram.

First, at S10, when the variation amplitude and the variation cycle are input to the variation value setting unit 11, a variation diagram illustrated in FIG. 4 is generated and displayed in the monitor 12 at S20 (drawing step). Here, a variation amplitude-variation cycle graph that plots the variation amplitude to vary the rotation speed on the vertical axis and the variation cycle on the horizontal axis is displayed.

The graph also displays a setting value of the current variation amplitude-variation cycle (current variation position) as a first point by a black-circle marker (variation position display step). An operator inputs the respective values of the variation amplitude and the variation cycle by directly pointing any given position on the graph or with a numeric keypad (not illustrated) or the like to change the respective setting values of the variation amplitude and the variation cycle.

Next, at S30, the graph displays a reduction effect index (reduction effect index display step). The reduction effect index of chatter vibration has a correlation with a speed ratio α that is a ratio of a rotation speed at one rotation therebefore to a rotation speed at the same rotation position of the main spindle 3 at any given timing. The speed ratio α is shown in the following Math. 3.

$$\alpha = \frac{S_B}{S_A} \qquad \text{[Math. 3]}$$

α: Speed ratio
$S_A$: Rotation speed at any given timing $t_A$
$S_B$: Rotation speed at one rotation therebefore with respect to $t_A$ As illustrated in a middle graph in FIG. 2, the speed ratio α varies to increase and decrease around 1 in synchronization with variation of the rotation speed. The larger the difference between the speed ratio α and 1 becomes, the more the reduction effect of the chatter vibration increases. Therefore, for example, a reduction effect index β is defined by the following Math. 4, which means that the larger the β becomes, the larger the chattering reduction effect becomes.

$$\beta = |\alpha - 1| \qquad \text{[Math. 4]}$$

Figure 2:
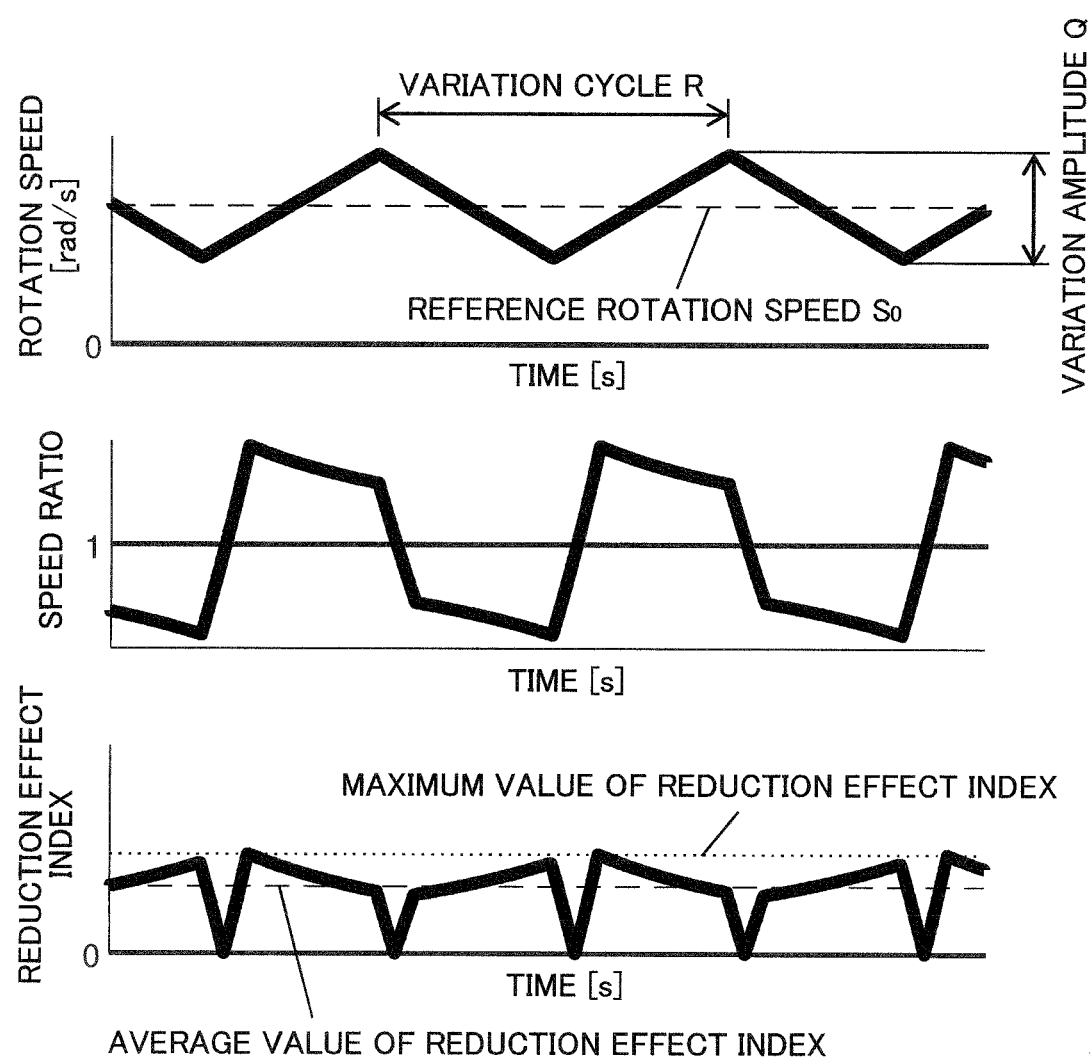
FIG. 2 is an explanatory view illustrating variation examples of a main spindle rotation speed, a speed ratio, and a reduction effect index.

Therefore, for example, at S30, average values per cycle of the speed variation of the reduction effect index β illustrated in a lower graph in FIG. 2 are calculated for respective combinations of the variation amplitudes and the variation cycles displayed in the variation diagram. The average values are displayed at respective coordinate points in the graph using the colors corresponding to their magnitudes. In FIG. 4, the coordinate points at which the reduction effect index are large are illustrated using dark colors, and the coordinate points at which the reduction effect index are small are displayed using bright colors.

In the machining where a machining period is considerably short relative to the variation cycle, the machining in accordance with a timing at which the reduction effect index β increases is effective. In the case, at S30, the maximum value in one cycle of the speed variation of the reduction effect index β, which is illustrated in the lower graph in FIG. 2, may be displayed on the graph.

At S40, an output limit line L is displayed in the graph (output limit line displaying step). Flowing an excessive current to the motor 6 generates heat and results in breakage of the motor 6, and therefore the upper limit of the input electric power is regulated. In other words, the motor output is limited. Therefore, even when the variation amplitude of the rotation speed is set to large and the variation cycle is set to small, the variation cannot be performed with the set value in some cases.

For example, the following Math. 5 is calculated, thus displaying the output limit line L on the graph as a limit line of the variable variation amplitude and variation cycle. Note that the maximum rotation speed $S_{max}$ of the main spindle 3 and the minimum rotation speed $S_{min}$ of the main spindle 3 used in Math. 5 can be calculated with a reference rotation speed as a reference for the varying rotation speed and the variation amplitude as shown in Math. 6 and Math. 7. It expresses that the rotation speed can be varied as the setting value in a range on the right side from the output limit line L. That is, the variation condition in the darkest color within the range is preferably selected in the variation value setting unit 11. Math. 5 expresses that an output found by subtracting a loss ($P_C$) due to, for example, cutting and friction caused by the main spindle rotation from the maximum output of the motor 6 can be used for the variation of the main spindle rotation speed.

$$R = \frac{2J}{P - P_C}(S_{max} - S_{min})S_{max} \quad [\text{Math. 5}]$$

R: Variation cycle
J: Inertia of a rotating body including the workpiece and the main spindle
P: Maximum output of the motor
$P_c$: Sum of cutting output and loss output
$S_{max}$: Maximum rotation speed of the main spindle
$S_{max}$: Minimum rotation speed of the main spindle $$S_{max} = S_0\left(1 + \frac{Q}{200}\right) \quad [\text{Math. 6}]$$

$S_0$: Reference rotation speed
Q: Variation amplitude $$S_{min} = S_0\left(1 - \frac{Q}{200}\right) \quad [\text{Math. 7}]$$

It should be noted that, compared with the variation of the rotation speed at constant angular acceleration, the variation of the rotation speed at angular acceleration increased and decreased according to the increase and decrease in rotation speed allows obtaining a larger chattering reduction effect. In the case, instead of Math. 5 described above, the output limit line L of the variation amplitude and the variation cycle is calculated by the following Math. 8 using a ratio of the maximum rotation speed to the minimum rotation speed.

$$R = \frac{2J}{P - P_C}(S_{max} - S_{min})S_{max}\frac{S_{max}}{S_{min}} \quad [\text{Math. 8}]$$

Thus, the monitoring device 13 of the main spindle rotation speed of the embodiment allows performing the monitoring method from S20 to S40 described above as the drawing unit, the variation position display unit, and the reduction effect index display unit. The drawing unit displays the graph illustrating the relationship between the variation amplitude and the variation cycle of the rotation speed in the monitor 12. The variation position display unit displays the current variation position (first point) on the graph. The reduction effect index display unit displays the reduction effect index of chatter vibration for each variation condition on the graph based on Math. 4.

Accordingly, after grasping the reduction effect of chatter vibration, the setting value to vary the rotation speed can be selected, and trial machining can be performed, and therefore the machining condition optimal to reduce the chatter vibration can be efficiently found.

In particular, since the output limit line L of the variation amplitude and the variation cycle of the motor 6 can be generated based on Math. 5 and displayed on the graph, the variation condition is searched after grasping the output limit line L of the motor 6. Therefore, it is possible to avoid the selection of the variation condition exceeding the limit of the motor 6.

While the embodiment indicates the reduction effect index even in a range on the left side from the output limit line L, it is a variation condition region where the rotation speed cannot be varied as the set value. Therefore, in order to suggest it, the reduction effect index does not have to be displayed.

When the graph is displayed in the monitor, the reduction effect index and the output limit line are automatically calculated and displayed. However, the reduction effect index and the output limit line may be displayed at any given respective timings by the input unit disposed in the variation value setting unit. The configuration of the graph is obviously not limited to the contents, and changes, such as an inversion of the axes and three-dimensional display, are possible. The display of the output limit line can be omitted.

Additionally, the display of the variation position is not limited to be the circle. A marker having another shape may be selected, or shapes of the markers of the current variation position and the new variation position may be different from each other.

Meanwhile, the rotation speed is varied from the beginning and the machining is performed in the embodiment. In a machine tool including the well-known detection unit that compares a vibration obtained through detection of a vibration of a main spindle by a vibration sensor with a predetermined threshold and detects a chatter vibration, the main spindle may be rotated at a set uniform speed at first. Then, in the machine tool, when the detection unit detects the chatter vibration, the variation amplitude and the variation cycle of the rotation speed may be input in the variation value setting unit to vary the rotation speed, and the variation diagram, such as a graph, may be displayed in the monitor.

Additionally, any variation amplitude and variation cycle can be set by the operator with the variation value setting unit. However, also in a case where the variation value is automatically set by a program, the reduction effect index can be displayed.

Furthermore, while the configuration employs the difference between the maximum rotation speed and the minimum rotation speed in each of Math. 5 and Math. 8, the configuration is not limited to the configuration. Respective values close to the maximum rotation speed and the minimum rotation speed may be obtained at any given timing to calculate the relationship between the variation amplitude and the variation cycle. The same applies to the case of using the ratio.

Furthermore, the disclosure is not limited to the NC lathe, and as long as the machine tool varies the rotation speed and performs the cutting work, for example, a machining center is included. Accordingly, the disclosure is also similarly applicable to a machine tool that includes only a tool spindle.

Also in a case of the machine tool that includes the tool spindle to which a tool is mounted and to be motor-driven and varies a rotation speed of the tool spindle together with a rotation speed of a workpiece spindle, it is only necessary that the reduction effect index of chatter vibration related to the tool spindle by Math. 3 and Math. 4 described above is displayed together.

Besides, the storage unit, the variation value setting unit, and the monitor, which constitute the monitoring device, may be separated from the NC device and connected to the machine tool wirelessly or wired. In the case, one monitoring device performs centralized control on a plurality of machine tools, thus ensuring setting the variation amplitude and the variation cycle and displaying the reduction effect index.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool comprising:
   a motor-driven main spindle to which a tool or a workpiece is mounted;
   a rotation speed variation unit for continuously varying a rotation speed of the main spindle in any given pattern; and
   a monitoring device for monitoring the rotation speed of the main spindle and displaying a variation state of the rotation speed by the rotation speed variation unit using a display unit in the machine tool,
   wherein the monitoring device includes:
   a drawing unit configured to display a variation diagram in the display unit, the variation diagram illustrating a relationship between a variation amplitude and a variation cycle of the rotation speed;
   a variation position display unit configured to display a current variation position in the variation diagram; and
   a reduction effect index display unit configured to display a reduction effect index on the variation diagram, the reduction effect index representing a reduction effect of chatter vibration, wherein the reduction effect index is calculated based on a speed ratio that is a ratio of a rotation speed of one rotation before to a rotation speed at an identical rotation position of the main spindle at any given timing.

2. The machine tool according to claim 1, wherein the reduction effect index is an absolute value of a difference between the speed ratio and 1.

3. The machine tool according to claim 1, wherein the varying reduction effect index is an average value per variation cycle of the rotation speed.

4. The machine tool according to claim 1, wherein the varying reduction effect index is a maximum value in one variation cycle of the rotation speed.

5. The The machine tool according to claim 1, further comprising
   an output limit line display unit configured to generate an output limit line of a motor based on a calculation formula and display the output limit line on the variation diagram, the calculation formula including the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, and a maximum output of the motor that drives the main spindle.

6. The machine tool according to claim 5, wherein the calculation formula is Math. 1 below $$R = \frac{2J}{P - P_C}(S_1 - S_2)S_1 \qquad [\text{Math. 1}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output.

7. The machine tool according to claim 5, wherein the calculation formula includes a ratio of the first rotation speed to the second rotation speed.

8. The machine tool according to claim 5, wherein the calculation formula is Math. 2 below $$R = \frac{2J}{P - P_C}(S_1 - S_2)S_1\frac{S_1}{S_2} \qquad [\text{Math. 2}]$$

R: Variation cycle
$S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output.

9. The machine tool according to claim 5, wherein any one of the first rotation speed and the second rotation speed is set as a maximum value of the rotation speed and another is set as a minimum value of the rotation speed.

10. A method of monitoring a machine tool comprising:
    a motor-driven main spindle to which a tool or a workpiece is mounted;
    a rotation speed variation unit for continuously varying a rotation speed of the main spindle in any given pattern; and
    a monitoring device for monitoring the rotation speed of the main spindle and displaying a variation state of the rotation speed by the rotation speed variation unit using a display unit in the machine tool,
    wherein the monitoring method includes the steps of:
    displaying a variation diagram in the display unit, the variation diagram illustrating a relationship between a variation amplitude and a variation cycle of the rotation speed;
    displaying a current variation position in the variation diagram; and
    displaying a reduction effect index on the variation diagram, the reduction effect index representing a reduction effect of chatter vibration, wherein the reduction effect index is calculated based on a speed ratio that is a ratio of a rotation speed of one rotation before to a rotation speed at an identical rotation position of the main spindle at any given timing.

11. The monitoring method according to claim 10, wherein
the reduction effect index is an absolute value of a difference between the speed ratio and 1.

12. The monitoring method according to claim 10, wherein
the varying reduction effect index is an average value per variation cycle of the rotation speed.

13. The monitoring method according to claim 10, wherein
the varying reduction effect index is a maximum value in one variation cycle of the rotation speed.

14. The monitoring method according to claim 10, further comprising
generating an output limit line of a motor based on a calculation formula and displaying the output limit line on the variation diagram, the calculation formula including the variation cycle, a difference between a first rotation speed and a second rotation speed at mutually different timings among the rotation speeds varied relative to a reference rotation speed as a reference for the rotation speed, an inertia of a rotating body including the tool or the workpiece and the main spindle, and a maximum output of the motor that drives the main spindle.

15. The monitoring method according to claim 14, wherein
the calculation formula is Math. 1 below $$R = \frac{2J}{P - P_C} (S_1 - S_2) S_1 \qquad [\text{Math. 1}]$$

R: Variation cycle $S_1$: Rotation speed at any given timing $t_1$ (first rotation speed)
$S_2$: Rotation speed at any given timing $t_2$ (second rotation speed)
J: Inertia of rotating body
P: Maximum output of motor
$P_C$: Sum of cutting output and loss output.

16. The monitoring method according to claim 14, wherein
the calculation formula includes a ratio of the first rotation speed to the second rotation speed.

17. The monitoring method according to claim 14, wherein
the calculation formula is Math. 2 below, $$R = \frac{2J}{P - P_C} (S_1 - S_2) S_1 \frac{S_1}{S_2} \qquad [\text{Math. 2}]$$

R: Variation cycle
$S_1$: Rotation speed at any given timing $t_1$ (first rotation speed)
S2: Rotation speed at any given timing $t_2$ (second rotation speed)
J: Inertia of rotating body
P: Maximum output of motor
$P_C$: Sum of cutting output and loss output.

18. The monitoring method according to claim 14, wherein
any one of the first rotation speed and the second rotation speed is set as a maximum value of the rotation speed and another is set as a minimum value of the rotation speed.

* * * * *